(12) United States Patent
Willis et al.

(10) Patent No.: US 8,847,879 B2
(45) Date of Patent: Sep. 30, 2014

(54) MOTIONBEAM INTERACTION TECHNIQUES FOR HANDHELD PROJECTORS

(75) Inventors: Karl D. Willis, Pittsburgh, PA (US); Ivan Poupyrev, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 131 days.

(21) Appl. No.: 13/083,054

(22) Filed: Apr. 8, 2011

(65) Prior Publication Data

US 2011/0248913 A1    Oct. 13, 2011

Related U.S. Application Data

(60) Provisional application No. 61/322,098, filed on Apr. 8, 2010.

(51) Int. Cl.
| | | |
|---|---|---|
| G09G 5/00 | (2006.01) |
| G03B 21/26 | (2006.01) |
| G06F 3/0346 | (2013.01) |
| G06F 3/038 | (2013.01) |
| G06F 1/16 | (2006.01) |
| G06F 3/01 | (2006.01) |

(52) U.S. Cl.
CPC .............. *G06F 3/017* (2013.01); *G06F 3/0346* (2013.01); *G06F 3/038* (2013.01); *G06F 1/1637* (2013.01)
USPC ............................................. 345/156; 353/28

(58) Field of Classification Search
CPC ........ G06F 3/03; G06F 3/0304; G06F 3/0325
USPC ....................................... 345/156; 353/1–122
See application file for complete search history.

(56) References Cited

U.S. PATENT DOCUMENTS

| 2008/0111076 A1* | 5/2008 | Silverbrook et al. ...... 250/338.1 |
| 2009/0091710 A1* | 4/2009 | Huebner ......................... 353/28 |
| 2009/0249226 A1* | 10/2009 | Manolescu et al. ........... 715/757 |

OTHER PUBLICATIONS

Blasko, G., Coriand, F. and Feiner, S. Exploring Interaction with a Simulated Wrist-Worn Projection Display. In Proc. ISWC 2005 IEEE (2005), 2-9.

Cao, X. and Balakrishnan, R. Interacting with Dynamically Defined Information Spaces using a handheld Projector and a Pen. In Proc. UIST 2006, ACM(2006), 225-234.

(Continued)

*Primary Examiner* — Alexander Eisen
*Assistant Examiner* — Mark Regn
(74) *Attorney, Agent, or Firm* — Patterson & Sheridan LLP

(57) ABSTRACT

An image projection system may be configured to project objects which respond to movements and gestures made using a handheld projector, as well as to methods for controlling the projected objects based on such user input. For example, users may interact with and control objects in a projection frame by moving and/or gesturing with the handheld projector. Further, objects or characters projected using the handheld projector may be configured to perceive and react to physical objects in the environment. Similarly, elements of the physical environment may be configured to respond to the presence of the projected objects or characters in a variety of ways.

22 Claims, 9 Drawing Sheets

(56) References Cited

OTHER PUBLICATIONS

Hosoi, K., Dao, V.N., Mori, A. and Sugimoto, M. CoGame: Manipulation Using a Handheld Projector. SIGGRAPH 2007 Emerging Technologies, ACM (2007).

Mistry, P., Maes, P. and Change, I. WUW—Wear Ur World—A wearable Gestural Interface. CHI 2009, ACM (2009).

Raskar, R., Beardsley, P., van Baar, J., Wang, Y., Dietz, P., Lee, J., Leigh, D. and Willwacher, T. RFIG Lamps: Interacting with a Self-Describing World via Photosensing Wireless Tags and Projectors. In Proc. SIGGRAPH 2004, ACM (2004), 406-415.

Raskar, R., van Baar, J., Beardsley, P., Willwacher, T., Rao, S. and Forlines, C. iLamps: Geometrically Aware and Self-Configuring Projectors. ACM Transactions on Graphics 22, 3 (2003), 809-818.

* cited by examiner

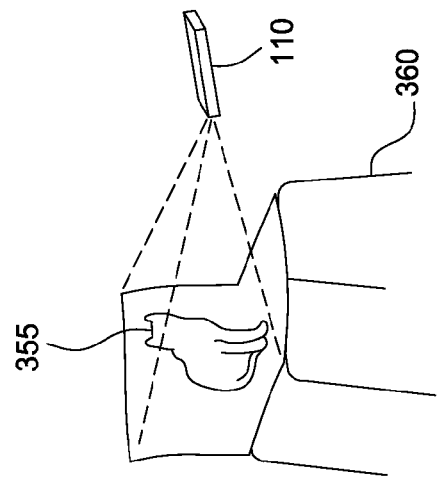
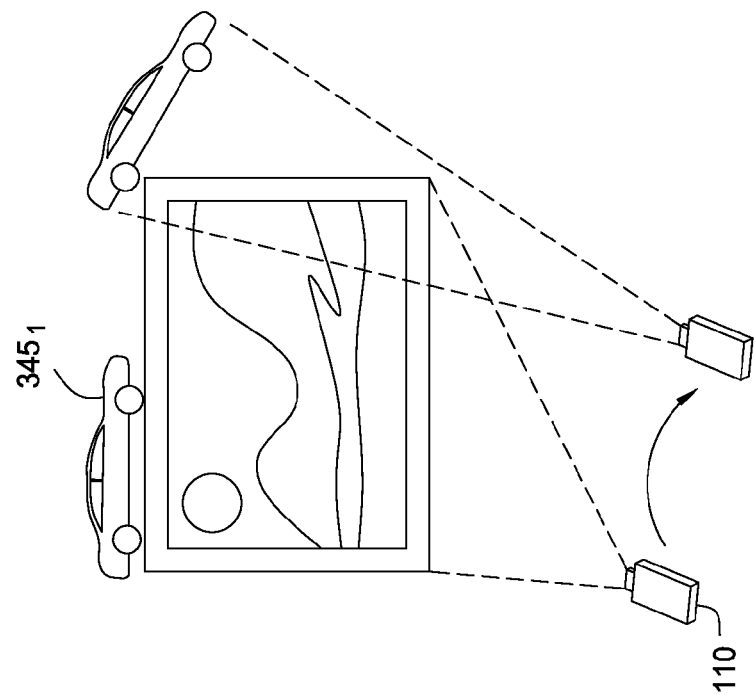

MOTIONBEAM INTERACTION TECHNIQUES FOR HANDHELD PROJECTORS

CROSS REFERENCE TO RELATED APPLICATIONS

This application claims benefit of U.S. provisional patent application Ser. No. 61/322,098 filed Apr. 8, 2010, which is hereby incorporated by reference in its entirety.

BACKGROUND

1. Field of the Invention

Embodiments of the present invention relate to handheld projectors. More particularly, embodiments of the present invention provide techniques for controlling objects in an image projected from a handheld projector based on user movements and gestures.

2. Description of the Related Art

Over the last decade, image projection systems have been developed that are small enough to fit comfortably within a person's hand. Such handheld projectors (sometimes referred to as pocket projectors or mobile projectors or pico projectors) provide an image projector as a handheld device, and handheld projection systems can project images onto any nearby viewing surface, such as a wall.

Additionally, a handheld projector can be connected to (or integrated with) other portable devices such as mobile phones, personal digital assistants, and digital cameras. Handheld multimedia devices have evolved to provide sophisticated computing platforms, complete with large display areas, touch, sensitive surfaces and cameras, among other components. Further, the computing power of these devices has steadily increased; allowing sophisticated computing applications to be executed from the palm of one's hand. For example, handheld devices now frequently include computing hardware capable of rendering 3D graphics images in real time, and a variety of rendering applications are available for handheld devices. Handheld projectors can be connected to (or integrated with) these types of portable devices. When combined with (or connected to a computing system) a handheld projector can project any image generated by the computing system onto a viewing surface.

However, one of the major challenges when dealing with handheld projectors has been to develop interaction techniques that accommodate movement. Projected imagery moves, shakes, and distorts with every move of the user's hand, and a variety of approaches have been used to attempt to mitigate the effects of projector movement.

SUMMARY

One embodiment of the invention provides a method for presenting display frames projected using a handheld projector. This method may generally include projecting a first display frame from the handheld projector, wherein the first display frame projects, on a display surface, one or more animated objects displayed so as to simulate motion to a viewer. Further, the objects may be animated in a manner so as to be responsive to changes in position and orientation of the handheld projector. This method may also include receiving an indication of a current position and orientation of the handheld projector and generating one or more subsequent display frames projected from the handheld projector. The projected image of at least a first one of the objects depends on the current position and orientation of the handheld projector.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 3A-3G illustrate a variety of user movements and gestures used to control objects projected using a handheld projection system, according to one embodiment of the invention.

DETAILED DESCRIPTION OF EXEMPLARY EMBODIMENTS

Figure 1:
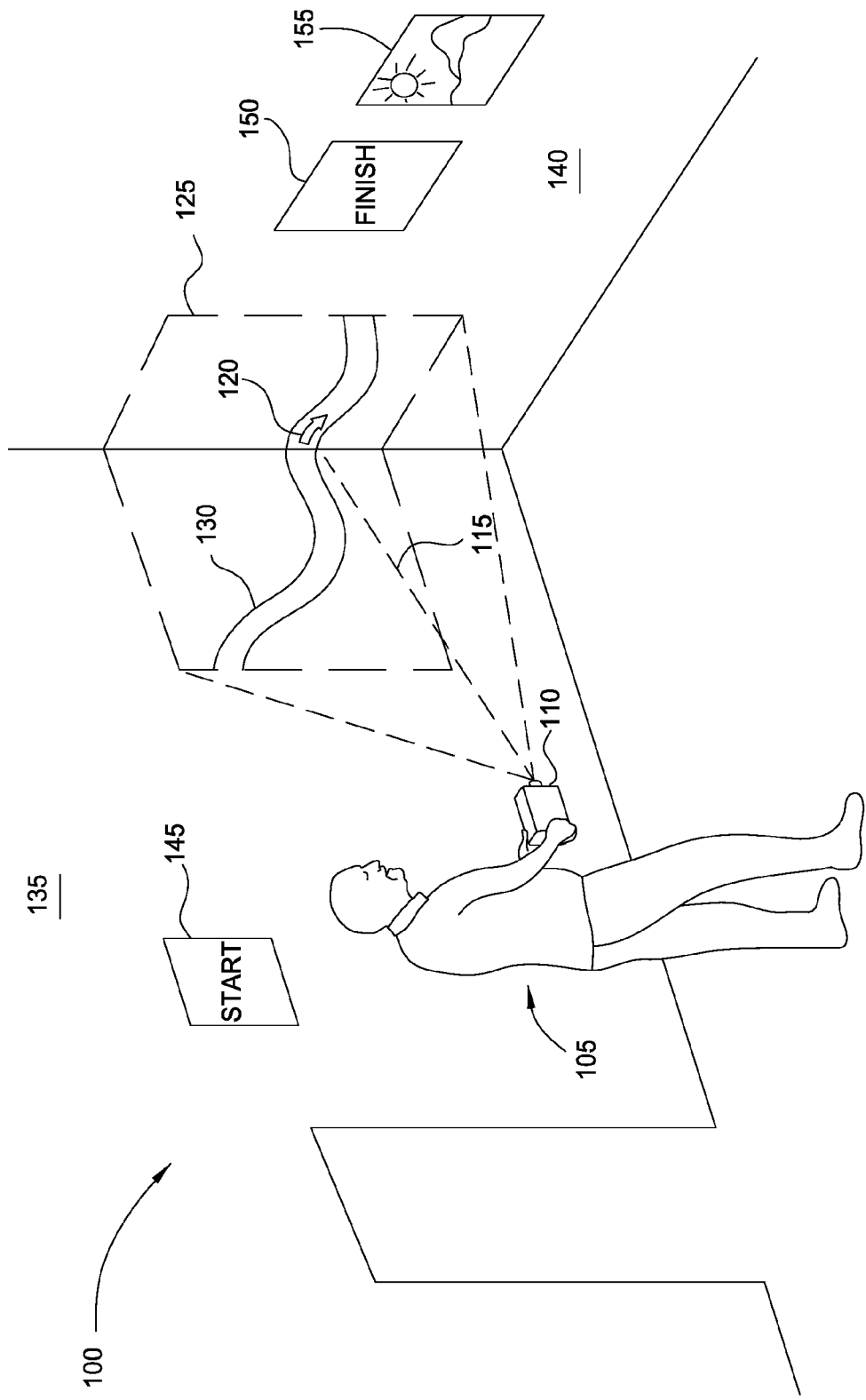
FIG. 1 illustrates an example of a user manipulating a handheld projector configured to respond to user movements and gestures, according to one embodiment of the invention.

Embodiments of the invention include an image projection system configured to project objects that respond to movements and gestures made using a handheld projector, as well as to methods for controlling the projected objects based on such user input. For example, users may interact with and control a character by moving and/or gesturing with the handheld projector itself. Doing so creates a unified interaction style where input and output are tied together within a single device.

Handheld projectors allow projected content to be situated side by side with physical objects in almost any space. The size of handheld projectors allows users to grasp them in a single hand, attach them to their bodies or move them from space to space. Some work has been done to mitigate or compensate for projector movement, e.g., to smooth jitter resulting from a user holding a handheld projector. However, rather than attempt to mitigate or compensate the effects of projector movement, embodiments of the invention encourage the use of handheld movement, using the projector itself as a gestural input device. Doing so allows virtual characters (or other projected objects) to blend into the physical world. Character interaction has applicability to a range of domains such as games, educational software, virtual worlds, storytelling and numerous other applications where an avatar is used to represent a user.

In one embodiment, characters projected using the handheld projector may be configured to respond and react to physical objects in the environment. Further, elements of the physical environment may be configured to respond to the presence of the projected characters in a variety of ways.

In the following, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Further, embodiments are generally described herein relative to a projection system integrated with a handheld computing device executing a program configured to respond to user movements and gestures. However, one of ordinary skill in the art will recognize that embodiments of the invention may be implemented in variety of ways. For example, the computing system need not be integrated with the handheld projector, but could communicate over wireless (or wired) communication networks. Additionally, embodiments are sometimes described relative to a "character" within a projection frame (which may or may not be an avatar under direct control of a user via the handheld projector). However, more generally, any projected object in the projection frame (e.g., projected symbols, shapes, images, vehicles, animals, etc.) can be controlled using the gestural input techniques described herein. Further still, such a projection frame may be used to generate two or three dimensional images.

FIG. 1 illustrates an example of a user 105 manipulating a handheld projector 110 configured to respond to user movements and gestures, according to one embodiment of the invention. In one embodiment, the movement of the handheld projector 110 is used to both project display images as well as provide an approach for controlling projected characters with user movements and gestures, merging virtual content with elements of the physical environment. The approach for user interaction involves the control of an object on the end of a metaphorical beam (sometimes referred to as a "motion beam"). The user controls one end of the beam and the object is linked to the opposite end. Moving the object up and down, or left and right is as simple as pointing the beam by sweeping the handheld projector in the desired direction.

Characteristics of the object can be changed dynamically based on how the user moves, gestures, and interacts with the motion beam. This may include dynamically changing a direction the object faces or changing the animated appearance of the object, e.g., by changing the direction, speed or behavior of an animated object or by changing the color, brightness, size of the object, etc. This could also include changing a viewing angle or perspective projection of the object, e.g., by customizing the animation as when a user translates the projection frame from one surface to another, such as from the face of one wall to another or from the face of one wall to a ceiling or floor. The animation of the object may also change when an object encounters other virtual and/or physical objects in the environment. The hands-on control of the object provided by the handheld projector creates an impression of a direct link between the handheld projector and the animated object. Further, physical movement and angling of the device may draw upon users' intuitive understanding of physics, e.g., by having animated objects conform to expectations of momentum and gravity.

Illustratively, the user 105 is generally standing within a room 100 and handheld projector 110 projects a display image 125 on a surface of wall 135 and wall 140. Further, within the display image 125, an arrow 120 is generally shown near the center of the display image 125. This example presents a simple game where the user navigates a path 130. As shown, the object 120 is generally configured to move in the direction pointed to by the arrow. Further, the user 105 may change what direction the arrow 120 is pointing to by rotating the handheld projector 110. The arrow itself remains in the center of the display image, as represented by a dashed line 115. Note, while rotating the handheld projector may change the direction (and movement) of the arrow, the handheld projector 110 may generate display images that keep the path 130 in a relatively constant position. For example, an application program executing on the handheld projector 110 (or on a computing system communicating with the handheld) may generate display images to animate the object moving through the path 130.

The handheld projector 110 may include accelerometers (or other sensing devices) used to monitor the position, orientation, or other movement of the handheld projector 110 or sense aspects of the display environment in which the handheld projector 110 is being used. For example, in addition to accelerometers, the handheld projector 110 could also include combinations of a magnetometer, a gyroscope and/or ultrasonic distance sensors. Further, the handheld projector 110 could also include a camera and use video recognition software to analyze aspects of the display environment.

The handheld projector 110 could also include components used to communicate or interact with the display environment. For example, the handheld projector 110 could be configured with an infrared (IR) receiver configured to receive signals from IR transmitters or IR tags present at different points on the display environment. Such a signal could trigger changes in how the objects are animated (referred to as a virtual environment trigger) or changes in the physical environment (referred to as physical environment trigger). Such a signal could also be used as a fiducial marker used as a reference point (or points) within the display environment. Conversely the handheld projector 110 could include an IR transmitter used to signal IR sensors in the display environment, allowing elements of the display environments to respond to the presence of a motion beam object when the handheld projector is pointed at one of the receivers. Other components that could be used include an optical laser or radio frequency ID tags (RFID tags), among others. Further still, the handheld projector 110 could also include components used to connect to a data communications network (e.g., an 802.11 wireless network interface or a Bluetooth transceiver).

In the particular example of FIG. 1, assume that when the arrow 120 shown in display image 125 deviates from the path 130, then the user has to "start over" by moving the arrow 120 to be positioned over a decal 145 affixed to the surface of wall 135. In such a case, the handheld projector 110 may be configured to determine when the arrow 120 is positioned at the decal 145. For example, the decal 145 may include an infrared (IR) tag used by the handheld projector 110 to determine when the motion beam object (i.e., the arrow 120) is being projected onto the decal 145. Once the user points the handheld projector 110 at the decal 145, a game begins and as the user sweeps the handheld projector 110 from the decal 145 (on the left side of the room) towards a decal 150 (on the right side of the room), the arrow 120 moves in the pointed direction. In this example, assume that software running on the handheld projector 110 (or on a system in communication with the handheld projector 110) generates the path 130 that the user should follow to the end at decal 150 by rotating the handheld projector 110. Further, assume that another IR tag is present at a decal 150. In the event the end point is reached, the display image could stop animating the arrow 120.

Additionally, elements of the physical environment may be configured respond to the presence of the projected objects. For example, a solenoid (or other mechanism) could be placed underneath a picture 155 hung on the wall 140 next to the decal 150. An IR transmitter could be connected to the solenoid and along with other components (e.g., a driver, electronics and power source). In such a case, the handheld projector 110 could monitor how fast the user is navigating through the path 130 (i.e., sweeping the projector from left to right), and if the user successfully navigates the path 130 at a sufficient speed (configured as parameter of the game), then the handheld projector 110 could transmit a signal received by an IR sensor integrated with the picture 155 which triggers the solenoid to knock the picture 155 off the wall. Doing so could effectively blend the virtual environment of the display image 125 and the physical environment of the room 100, making it appear as if the arrow 120 crashed into the picture 155, knocking it off the wall 140. This relatively simple example shows how the "motion beam" metaphor (represented by the dashed line 115) can be used with a hand-held projectors to physically control the environment surrounding the user.

Note, while shown being animated on generally flat surfaces (wall 135 and 140) objects could be animated and projected onto a variety of flat and dimensional physical objects such as things painted or attached to the wall, statutes, toys, windows, light sources, composited with animations projected by other display devices, etc.

Figure 2:
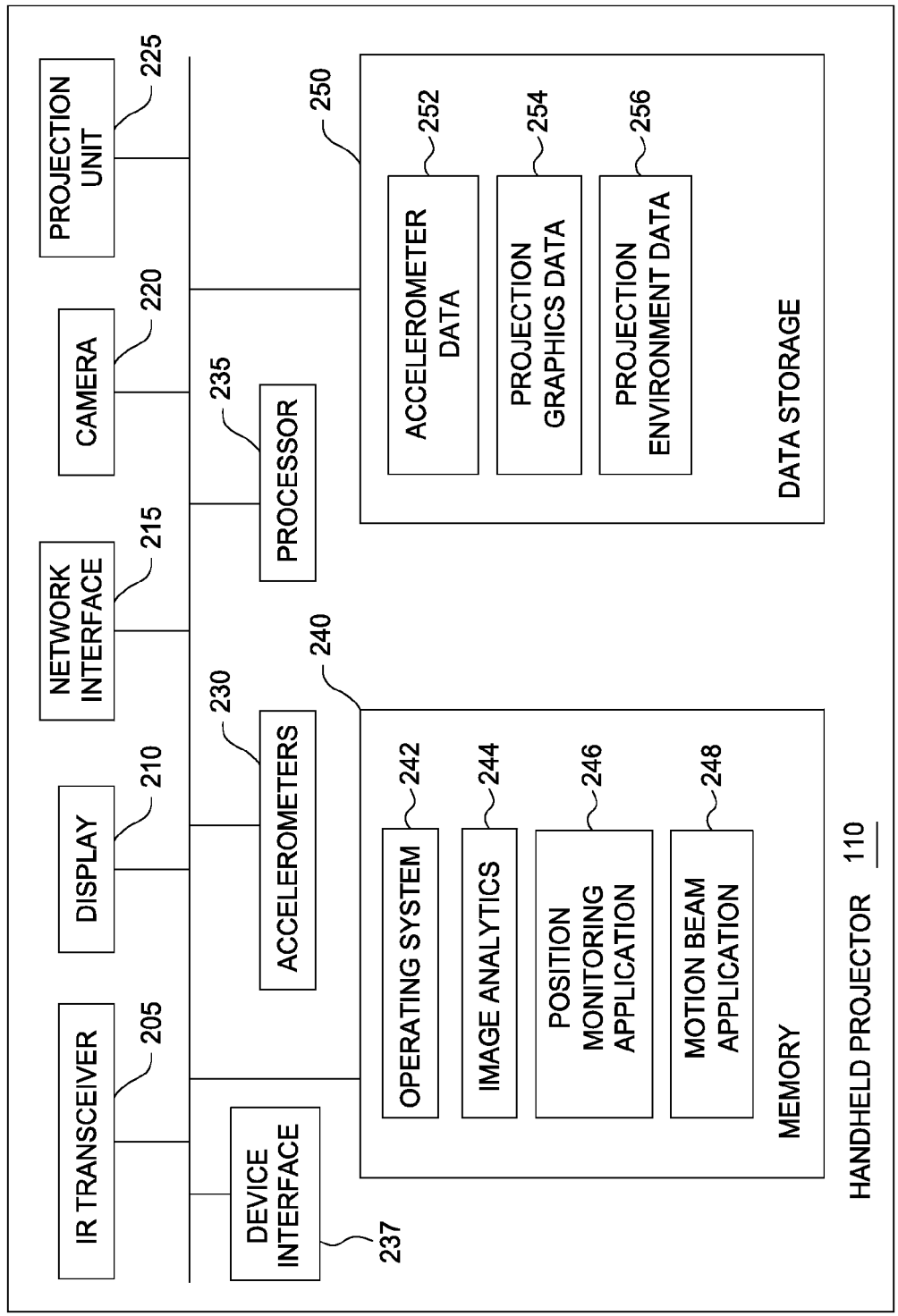
FIG. 2 illustrates an example of a handheld projector, according to one embodiment of the invention.

FIG. 2 illustrates an example of a handheld projector 110, according to one embodiment of the invention. In this example, the handheld projector 110 is illustrated as a handheld projector integrated with a handheld or mobile computing device. As shown, the handheld projector 110 includes, without limitation, an IR transceiver 205, a display 210, a network interface 215, a camera 220, a projector unit 225, accelerometers 230, a processor 235, device interface 237, memory 240 and data storage 250. In addition, the handheld projector 110 may also include a variety of sensing and/or signaling components, allowing handheld projector 110 to monitor the environment and objects in the environment. For example, the handheld projector 110 may include combinations of an IR receiver, a temperature monitor, a microphone, an ultrasonic range finder, a light sensor, a camera, a radio frequency (RF) monitor, a laser scanner, etc., as well as include signaling components used to communicate with devices in the environment such as an RF or Bluetooth transceiver, an IR transmitter, audio speakers, an RFID transmitter, etc., and components for projecting images (laser, projector w/light modulator, etc.)

The processor 235 retrieves and executes programming instructions stored in the memory 240 and/or storage 250. Processor 235 is included to be representative of a single CPU, multiple CPUs, a single CPU having multiple processing cores, GPUs having multiple execution paths, and the like. And the memory 240 is generally included to be representative of a random access memory. Storage 250, such as a flash memory device, may store non-volatile data. The network interface 215 may allow the handheld projector 110 to connect to data communications networks (e.g., wired Ethernet connection or an 802.11 wireless network). Note, although memory 240 and storage 250 are illustrated as separate components, a handheld or mobile computing device may use an integrated memory and storage architecture. Further, while illustrated using exemplary bus architecture to connect the components of handheld projector 110, one of ordinary skill in the art will recognize that mobile computing devices may use a variety of different hardware architectures.

The handheld projector 110 may also include a display 210 used to provide a user interface. For example, the display 210 may provide a touch sensitive surface allowing the user to select different application programs (e.g., to select what virtual environment to project using the projection unit 225). Alternatively or in addition, the device interface 237 may include a set of buttons, switches or other physical device mechanisms for controlling the handheld projector 110. For example, the device interface 237 could include a set of directional buttons used to navigate a menu presented on display 210 (or projected by projection unit 225). In such a case, the menu could allow users to select an application program. Additionally, the user interface could allow users to select, purchase or otherwise obtain data used by the motion beam application 248 to download different application programs as well as different characters or graphics for a particular game. For example, a user could download different avatars, characters, costumes chapters, or environments for use by a given motion beam application.

The IR transceiver 205 allows the handheld projector 110 to send and receive signals to/from the physical environment in which the handheld projector 110 is being used. For example, as noted above, the handheld projector 110 may receive a signal from an IR tag affixed to a wall when pointed at the tag. Similarly, the IR transceiver 205 may send signals to elements of the physical environment. Doing so may result in changes in the physical environment that appear to have been triggered by objects in the display image projected by projection unit 225. Of course, the handheld projector 110 may use other light or wireless (e.g., optical, acoustic and/or RF) sensing apparatus to communicate with elements of the physical environment, e.g., laser scanned barcodes, or fiducial markers, or CCD camera lens. Similarly, RFID tags could be used or the handheld projector 110 could communicate with other network-connected devices in the projection environment (using the network interface 215). Generally, embodiments of the present invention make use of any available wired or wireless communication and sensing technology to discern information from the environment and to communicate with physical objects in the environment. Likewise, embodiments of the invention make use of any available actuation and user interface technology such as solenoids, actuators, lights, sound generators, scent generators, motors, fans, valves, sprays and the like to implement physical events in the environment.

Accelerometers 230 provide components that measure acceleration of the handheld projector 110, i.e., acceleration of the handheld projector 110 relative to freefall. In one embodiment, the accelerometers 210 may be used to monitor magnitude and/or direction of the acceleration of the handheld device 105 as a vector quantity at a specified rate, e.g., the accelerometers in some currently available handheld devices operate at rate of 100 Hz. Data from the accelerometers 230 may be stored as accelerometer data 252 and accessed by application programs on the handheld projector 110 while projecting a virtual environment on a display surface.

Figure 3B:
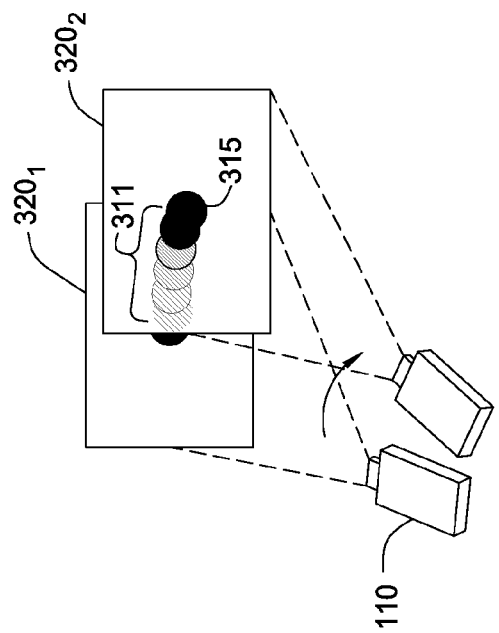
Figure 3A:
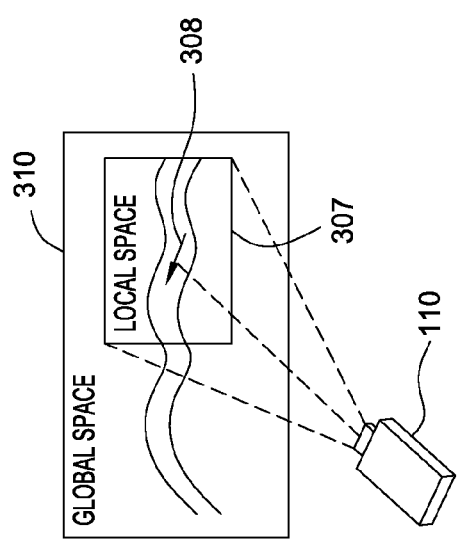

Illustratively, the memory 240 includes an operating system 242, an image analytics application 244, a position monitoring application 246, and a motion beam application 248. The operating system 242 generally controls the execution of application programs on the handheld projector 110. The position monitoring application 246 may be configured to analyze the accelerometer data 252 (and/or other sensor data) to monitor relative changes in position of the handheld projector 110. In turn, such information may be used by the motion beam application 248 to generate display images of objects or characters projected on the handheld projector 110, where the objects or characters are controlled by user movements of the handheld projector 110. FIGS. 3A-3B, discussed below, illustrate a variety of gestural inputs that may be used to control animated objects projected using the handheld projector 110.

Projection graphics data 254 and environment data 256 represent the geometry of the objects, characters, and/or environment animated by the motion beam application 248 and projected using the projection unit 225. In one embodiment, the graphics data 254 and environment data 256 could be downloaded from an online source. For example, users could download graphics data representing, characters, character costumes, appearance, features or attributes, and virtual environments from an online store. The handheld projector 110 may be configured to both receive graphics data from an online source over a network but also send payment and account data to an online source over the network. A network connection to an online system can use various security protocols and payment options to allow users to purchase additional content and software securely.

In addition to the graphics data representing the appearance of characters, objects and the virtual environment for a given application, users can also download data describing environmental behavior for a given motion beam application 248. For example, an application may include environmental triggers such as virtual environment triggers, where the virtual environment is changed when the motion beam object interacts with a trigger and physical environment triggers, where the physical environment is changed when the motion beam object interacts with a trigger.

The camera 220 may provide a CCD device configured to capture still-images and video stored in data storage 250. In addition to receiving information about the physical environment using IR transceiver 205 and data communication networks, the handheld projector 110 may also use the camera 220 to learn about the physical environment. Similarly, the camera 220 can be used to recognize objects in the environment, and once recognized these objects can trigger a change in the projected image. For example, in one embodiment, the image analytics application 244 may be configured to analyze images captured using the camera 220, and update, change, or modify the virtual environment projected by the motion beam application 248. For example, as the user moves the display image across a surface, the video analytics application 244 may use the camera 220 to identity changes in surface angles and make perspective corrections to the projected image. Further, the motion beam object or character may be configured to respond to changes in the projection surface identified by the video analytics application 244.

FIGS. 3A-3G illustrate a variety of user movements and gestures used to control objects projected using a handheld projection system, according to one embodiment of the invention. The movements and gestures in FIGS. 3A-3G illustrate different approaches for user interaction that control an animated object using the "motion beam" metaphor, i.e., where the user controls one end of the beam at the handheld projector and the motion beam object is linked to the opposite end.

First turning to FIG. 3A, as shown, a handheld projector 110 is shown projecting a local space 307 of a larger global space 310. The local space 307 is contained within the projection, and the global space 310 encompasses an overall larger projection environment. Physical movement of the handheld projector 110 translates the entire local space 307 within the global space 310. That is, the portion of the global space 310 explicitly projected at any given moment changes as the user moves the handheld projector 110. In this particular example, an arrow 308 remains relatively constant at the center of the local space 308, but can be navigated through the global space 310, (e.g., by changing the rotation of the handheld projector 110 and sweeping the handheld projector 110 up, down, left and right).

In one embodiment, a user may interact with the handheld projector to control menus, scroll lists on the projection image and perform user interface functions, e.g., to select motion beam software, characters, or other downloadable content from an online store. In such a case, in addition to animating specific projection frames the interface may respond to specific gestures. For example, a user may move the handheld projector to "draw" a circle around a desired item available for purchase (e.g., a particular animated character or costume for such a character). More generally, while the handheld projector projects the first sequence of display frames on a display surface and animates a motion beam object (or objects) the application could be configured to recognize predefined gestural inputs and respond by performing a predefined response corresponding to the gesturing input. In addition to the example of purchasing content, gestures could be used to reset or restart the motion beam program, select a new motion beam application, trigger physical environment triggers, or modify how the motion beam object is animated. As an example of the latter case, assume a user gestures by jerking the handheld projector sharply upward. In response the application could animate the motion beam object as though it had been thrown upward and then falling back to the "ground" where the user would regain control of the motion beam object.

FIG. 3B illustrates a handheld projector 110 projecting an initial display image $320_1$ and projecting a second display image $320_2$, following the user translating the projector 312 from an initial position to a second position. In this example, the movement of the handheld projector 110 is manifested in the animation of an animated object 315 (in this example a ball). Specifically, the physical movement of the handheld projector 110 is accentuated in the display frames $320_{1-2}$ by animating a motion trail 311 left behind the animated object 315. In this case, multiple, fading, images of the animated object 315 result in a path of prior motion being animated as the user moves the handheld projector 110 from the initial position to the second position. Other techniques may be used to stylize the animated object 315 in response to movements of the handheld projector 110, e.g., zip ribbons showing a path traveled, or blurring akin to long exposure photography.

Figure 3C:
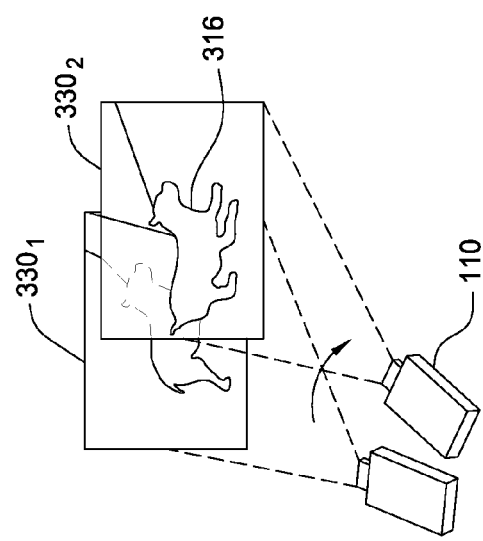

Similarly, FIG. 3C illustrates a handheld projector 110 projecting an initial display image $330_1$ and handheld projector 110 projecting a second display image $330_2$, following the user translating the projector 110 from an initial position to a second position. This example illustrates how physical properties of an animated object 316 (in this example, a dog on a leash) may be simulated based on user movement of the handheld projector 110. Physics of the animated object 316 may be simulated in response to translations from a center of the local space made when the user moves the handheld projector 110. For example, friction can be simulated in the virtual environment if the animated object 316 resists user movement and moves in the opposite direction—as shown by the dog resisting the movement of the handheld projector 110 by "pulling" against the leash in display frame $330_2$. This results from the user translating the handheld projector 110 from the initial position to the second position.

Similarly, the texture of a virtual or physical surface can be simulated by translating an animated object to depict a bumpy or smooth ride (e.g., as a car bouncing along a bumpy road). As another example, an animated can be influenced by simulated gravity. For example, an upward flick motion of the handheld projector could "throw" an animated object out of the local display space, only for the animated object to return back again seconds later.

Figure 3D:
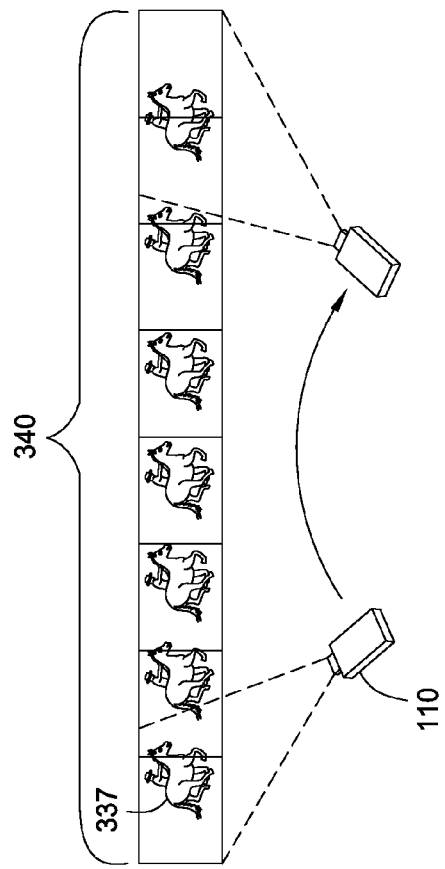

FIG. 3D illustrates a handheld projector 110 projecting a sequence of animation frames 340 as a user translates the projector 110 from an initial position to a second position. This example illustrates how a motion beam object may be animated in response to user movement of the handheld device 335. In this example an animated object 337 (specifically, a horse and rider) is animated in response to movement of the handheld projector 110. More generally, changes in the position or orientation of the handheld projector 110 may guide how the motion beam object is animated over time. Such an animation can be depicted in a number of ways including rotation, deformation, transformation, or color change Animations can be derived from movement of the motion beam object within the global space, interaction with virtual and physical objects, character behavior, and user gestures, etc. For example, the heading and speed of the handheld projector 110 may be used to animate the motion beam object accordingly. For example, assume the user moves the handheld projector 110 rapidly from right to left, in such a case, the animated object 337 (i.e., the horse and rider) could be animated galloping across the projection surface in the sequence of frames 340. Alternatively, if the user moves the handheld projector 110 slowly from right to left, the animated object 337 could be animated to perform a trotting motion in the sequence of frames 340. As another example, objects can be animated to face the direction of movement in a 3D space. These approaches demonstrate to the user that the motion beam object is "aware" of the overall environment and responsive to user interaction.

FIG. 3E illustrates a handheld projector 110 projecting an initial display image $345_1$ and projecting a second display image $345_2$, following the user translating the projector 110 from an initial position to a second position. The Example of FIG. 3E shows how the animation of a motion beam object can interact with physical objects present in the display environment. In this particular example, the first display image $345_1$ shows a car supported by a picture frame 341. When the handheld projector 110 is translated from right to left, the car could be animated to show the wheels turning creating the impression of the car being driven along the surface of the picture frame 341. Further, when the car moves sufficiently off the edge of the picture frame 341, the car could be animated to fall (as shown in display image $342_2$), creating the impression that the car has fallen off a cliff. More generally, depending on the desired interaction, a physical object can affect the motion beam object or the object can 'push back' and affect the physical object.

FIG. 3F shows an example of staging being used to situate an animated object 355 within the physical environment. As is known, in animation, the principle of staging refers to the process of focusing the attention of the audience by minimizing distractions in an animated frame. An important aspect of staging is the use of silhouette to highlight a main point of focus. In this example, staging is used to present the animated object 355 (a cat with a dark silhouette) sitting on a chair 360. Staging animated objects may be a useful for handheld projectors that have limited image brightness and contrast. In such cases, a strong silhouette may remain visible in conditions of high ambient light. Further, as with the other examples a staged motion beam object can be animated in response to movements of the handheld projector 110. For example, the animated object 355 (i.e., the cat) could be animated to jump from the chair 360 when the user translates the handheld projector 110 from being pointed at the chair 360 to other positions left or right of the chair 360 or animated to appear to climb the back of the chair 360 when the user translates the handheld projector 110 in an upward motion.

Figure 3G:
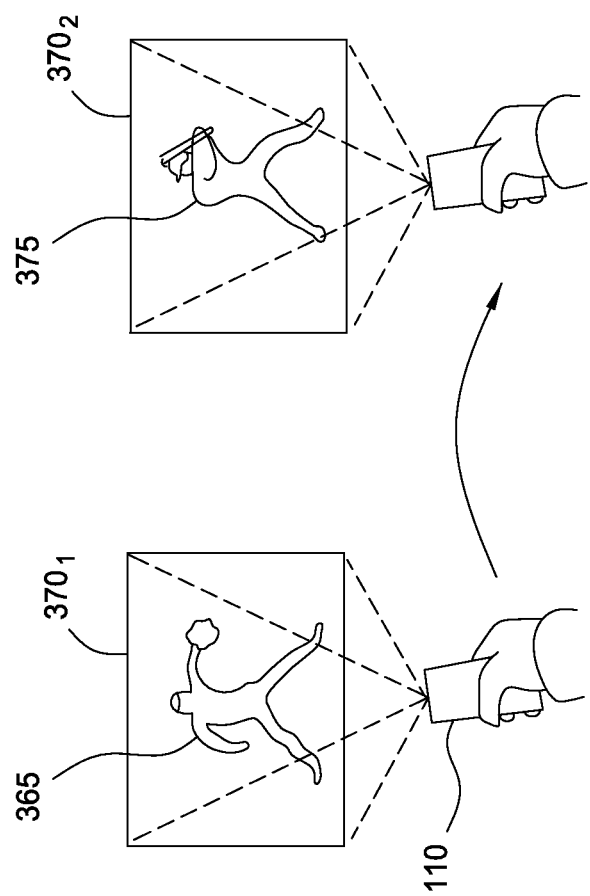

FIG. 3G shows an example of "closure" being used to convey the relationship between actions performed in projection frames $370_1$ and $370_2$ depicting different portions of a global space. The term closure is generally used in sequential art to infer meaning from a sequence of image panels. By viewing one panel followed by another a single meaning emerges. For example, a panel of a shooting gun beside another of a speeding ambulance infers that someone has been shot. The example shown in FIG. 3G illustrates the concept of "closure" being applied to a motion beam object over multiple projection frames. This approach may be used to reveal elements of an overall larger scene, where actions are shown sequentially in each frame to infer an overall meaning.

As shown, a handheld projector 110 is projecting a display frame 370₁ depicting a baseball pitcher 365 and a display frame 370₂ depicting a baseball batter 375. While the user translates the handheld projector 110 from left to right, the pitcher 365 could be animated to pitch a ball to the batter. Further, the intermediate display frames could animate a ball moving from left to right, and the batter 375 could be animated to swing at the pitch once the ball reaches the batter 375. While the baseball may not have followed a perfect path or transitioned with perfect timing (depending on how the user moves the handheld projector 110), closure results in users perceiving the interaction as being part of the same scene.

Figure 4:
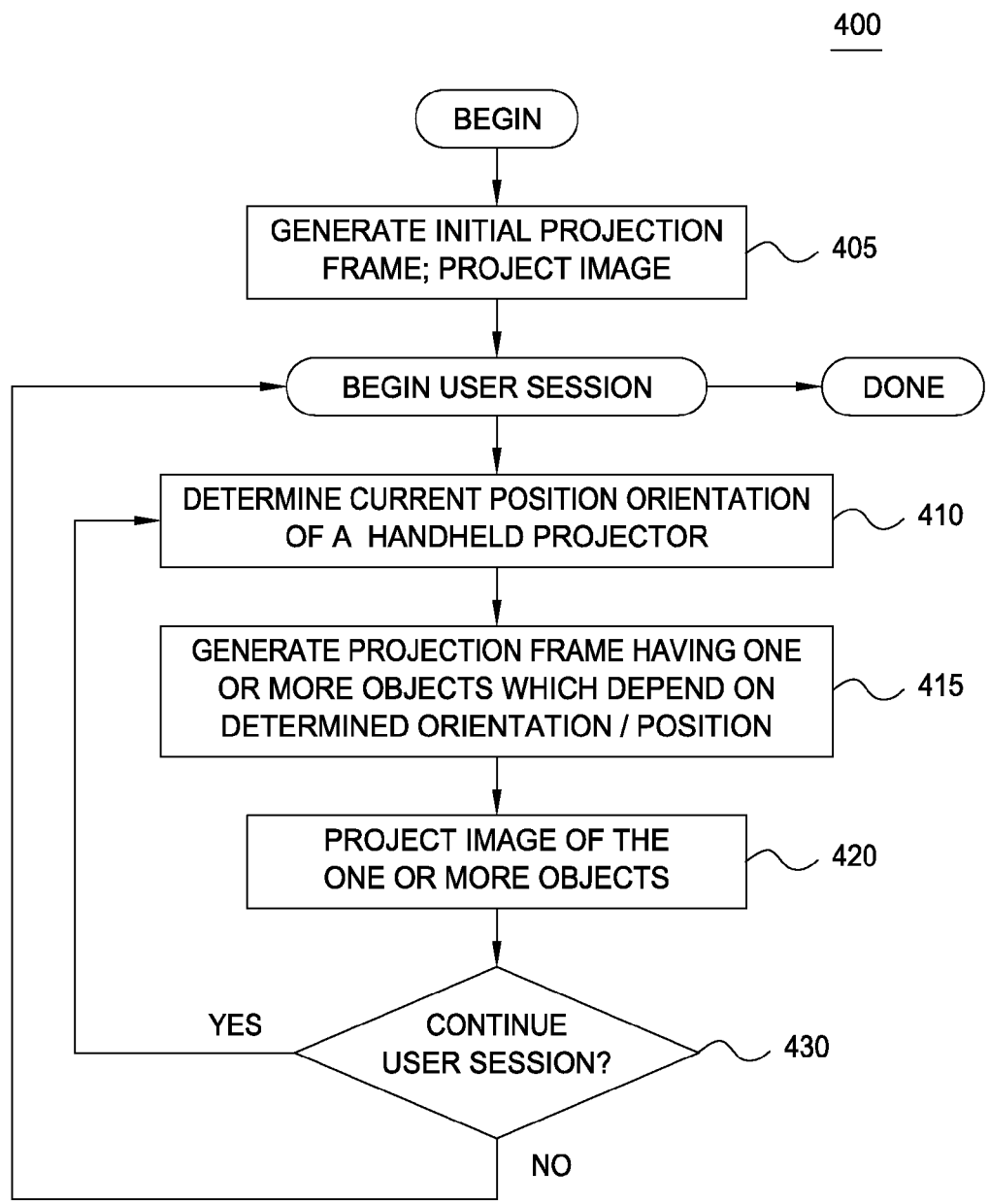
FIG. 4 illustrates a method for controlling objects projected using a handheld projection system, according to one embodiment of the invention.

FIG. 4 illustrates a method 400 for controlling objects projected using a handheld projection system, according to one embodiment of the invention. As shown, the method 400 begins at step 405 where a user executes a given motion beam application. As described above, the motion beam application may be configured to project a virtual environment, along with one or more motion beam objects on a display surface. Once the application begins executing, an initial display image is generated and projected using a handheld projector.

Following step 405, a loop begins where subsequent display frames are generated, which depend, at least in part, on the movement of the handheld projector. At step 410, a current position or orientation of a handheld projector is determined. For example, as noted above, the handheld projector may use accelerometers, magnetometers, gyroscopes, ultrasonic distance sensors, camera based video analytics and the like may to monitor movements/gestures made by the user holding handheld projector. At step 415, a projection frame may be generated which includes one or more objects or characters with visual characteristics that depend on the determined orientation/position of the handheld projector. Once generated, the frame, with the motion beam objects, is projected by the handheld projector. At step 430, the method returns to step 410 to generate the next projection frame, until the user ends the current user session.

Figure 5:
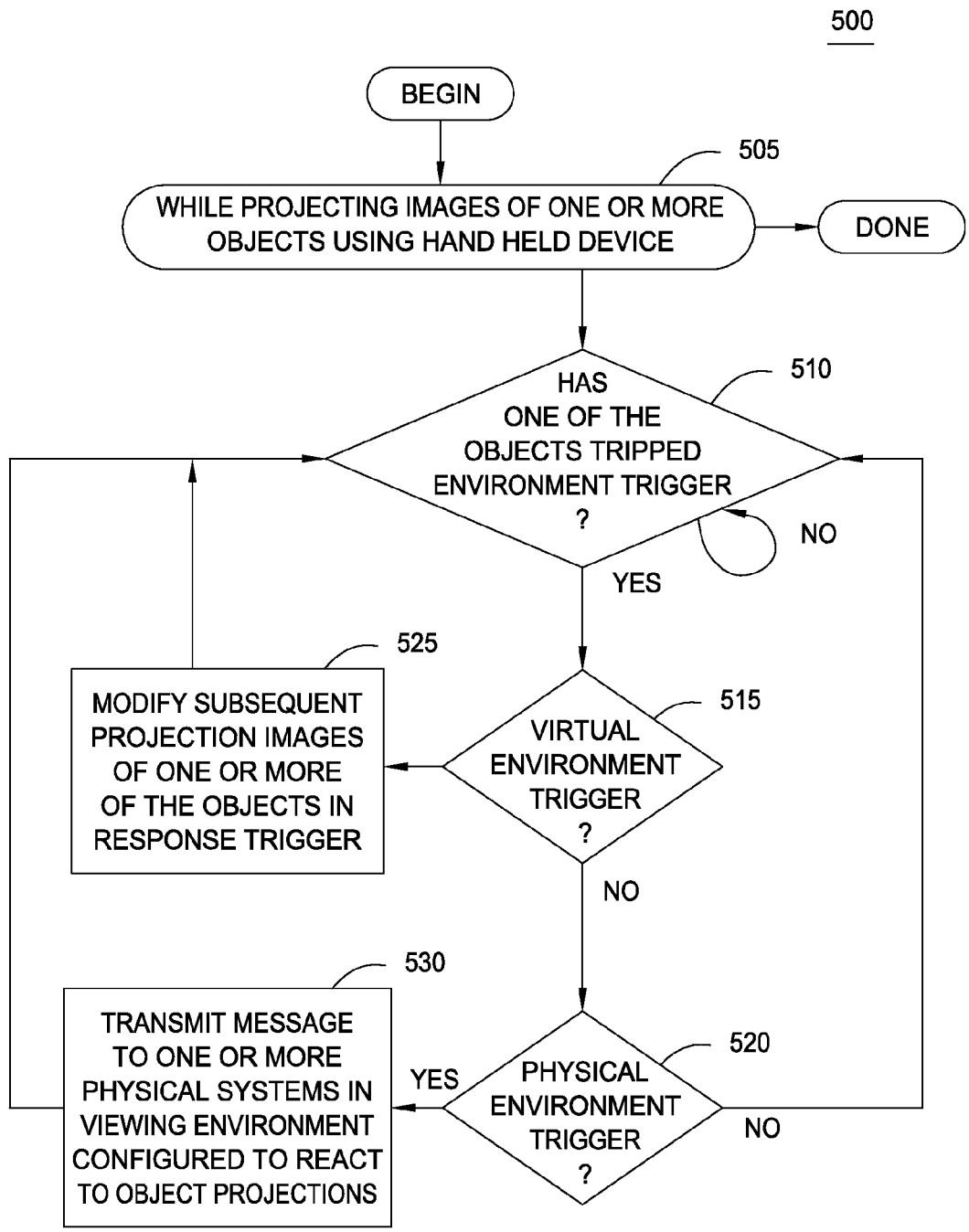
FIG. 5 illustrates a method for a handheld projection system to respond to environmental triggers, according to one embodiment of the invention.

As noted above, in addition to responding to the movement of the handheld projector, a motion beam object can respond to the physical projection environment. And conversely, the physical projection environment can respond to the motion beam object. FIG. 5 illustrates a method 500 for a handheld projection system to respond to environmental triggers, according to one embodiment of the invention. As shown, the method 500 begins at step 505 during a user session where one or more motion beam objects are displayed using a handheld projector, where user movements of the handheld projector control the objects.

At step 510, the handheld projection system determines whether one of the motion beam objects has tripped an environmental trigger. If not, the projection system continues to monitor the user interacting with the handheld projector until an environment trigger is tripped. Once such a trigger is tripped, the system determines whether a virtual environment trigger was tripped (step 515) or a physical environment trigger was tripped (at step 520).

Figure 6B:
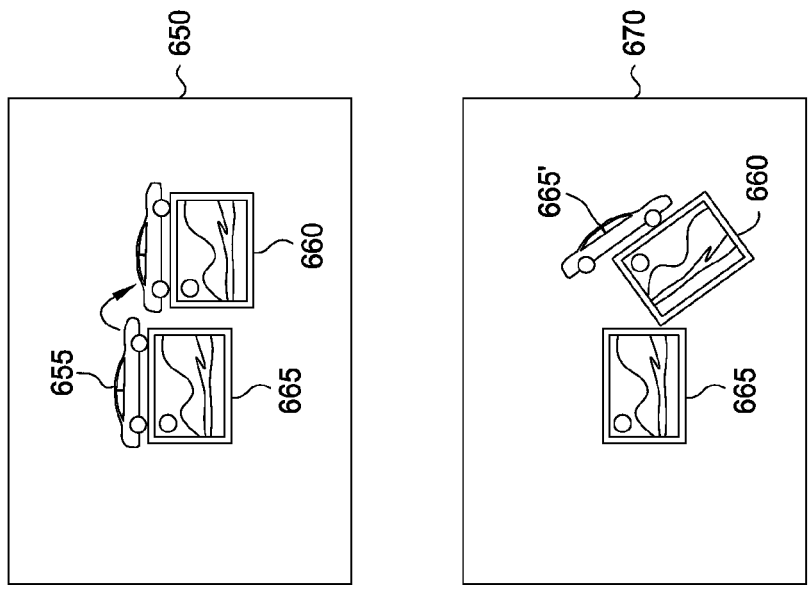
FIGS. 6A-6B illustrate examples of environmental triggers used to control objects projected using a handheld projection system, according to one embodiment of the invention.
Figure 6A:
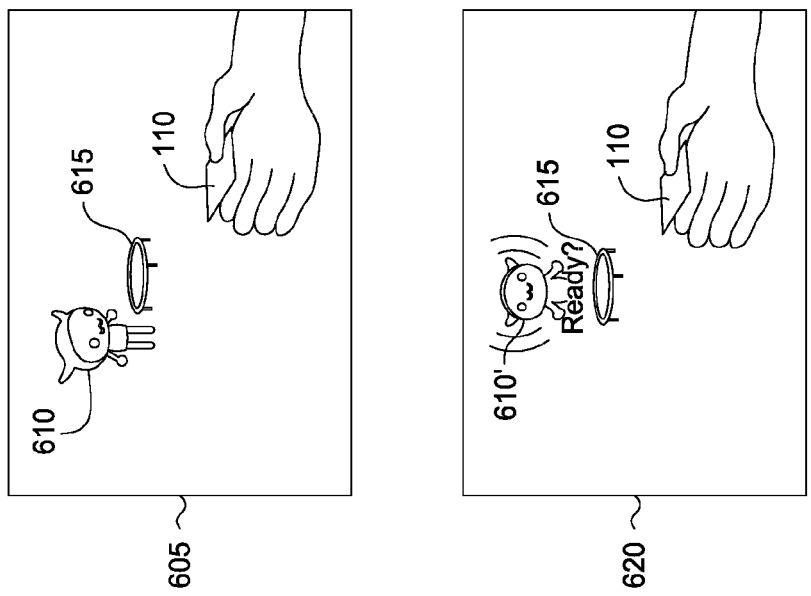

In the event of a virtual environment trigger, elements of the virtual environment (or of the animated motion beam object) are modified in subsequent display frames projected from the handheld projector (step 525). For example, FIG. 6A shows an example of a motion beam object animated in response to tripping a virtual environmental trigger, according to one embodiment of the invention. As shown in projection frame 605, an animated object 610 (in this example a cat character) is projected near an IR tag 615. Note, the projection frame 605 includes the cat character, but the IR tag 615 is attached to a projection surface. That is, the IR tag 615 (in this case a decal with the appearance of a small trampoline) is not part of the display frame projected by a handheld projector 110, but is instead part of the physical environment.

As the user translates the handheld projector 110, the cat character may be animated to appear to be walking back and forth. However, the handheld projector 110 may detect when the cat character is "standing" on the trampoline, i.e., when the projection image places the animated object 610 directly over the trampoline decal (i.e., over IR Tag 615. For example, the IR tag 615 may be configured to transmit a directional IR signal received when the handheld projector 110 is pointed directly at the IR tag 615. In response, the motion beam application 248 may modify the animation of the animated object 610. For example, frame 620 shows animated object 610' (i.e., the cat character) animated to appear as though it were jumping on the trampoline present in the physical display environment. Once the user moves the cat character away from the IR tag 615, the animation of the animated object may return to the cat walking back and forth.

Returning to the method 500 of FIG. 5, in the event of a physical environment trigger, elements of the physical environment are modified as subsequent display frames are projected from the handheld projector (step 530). For example, FIG. 6B shows an example of a motion beam object 655 animated in response to tripping a physical environmental trigger, according to one embodiment of the invention. In frame 650, a car object is shown using the top of a first picture frame 665 as a surface. As the user moves the handheld projector, the car object may be animated to appear to jump from picture frame 665 to a second picture frame 660. Further, the second picture frame 660 may include a physical environmental trigger attached to a solenoid (or other actuating mechanism). In such a case, when the car "lands" on the second picture frame 660, the environmental trigger is tripped when a signal from an IR tag is received by an IR transceiver on the handheld projector. The result is shown in display frame 670, where the solenoid is activated causing the second picture frame 660' to fall off of the wall. Further, the animation of the car 655' can be animated to appear to fall out of the frame 670 as its support surface (the second picture frame) is gone.

As another example, in one embodiment, a first handheld projector may be configured to respond to the presence of second handheld projector. In such a case, motion beam objects projected by the first and second handheld projectors could interact with one another in a variety of ways. For example, the solenoid attached to the second picture frame 660 could be configured to activate only when motion beam objects from two different handheld projectors encounter the physical environmental trigger (either in combination, giving the impression of "overweighting" the picture frame or in sequence, given the impression of "wearing out" the picture frame). Similarly, the motion beam objects could themselves react to each other's presence. For example, one motion beam object (say a cat) could be "frightened" by the presence of another motion beam object (say a dog). In such a case, the cat could be configured to "run" away from the dog when in close proximity to one another. A variety of object-to-object and object-to-environment interaction scenarios could be tailored to suit the needs of a particular case.

Advantageously, embodiments of the invention include an image projection system configured to project objects that respond to movements and gestures made using a handheld projector, as well as to methods for controlling the projected objects based on such user input. For example, users may interact with and control a character by moving and/or gesturing with the handheld projector itself. Doing so creates a unified interaction style where input and output are tied together within a single device. Further, objects or characters projected using the handheld projector may be configured to perceive and react to physical objects in the environment. Similarly, elements of the physical environment may be configured respond to the presence of the projected objects or characters in a variety of ways.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A computer-implemented method for presenting display frames projected using a handheld projector, the method comprising:
   projecting a first display frame from the handheld projector, wherein the first display frame projects, on a display surface, one or more animated objects responsive to changes in position and orientation of the handheld projector;
   receiving an indication of a current position and orientation of the handheld projector;
   receiving a signal broadcast from a virtual environmental trigger affixed to the display surface, wherein the signal is received when the virtual environmental trigger is within a display frame projected by the handheld projector; and,
   generating one or more subsequent display frames projected from the handheld projector, wherein the animation of at least a first one of the animated objects in the one or more subsequent display frames depends on the current position and orientation of the handheld projector and further depends on the position of the virtual environmental trigger within the display frame.

2. The method of claim 1, wherein the current position and orientation of the handheld projector is further determined from one or more sensing devices providing feedback to the handheld projector.

3. The method of claim 2, wherein the sensing devices includes at least one of an accelerometer, a magnetometer, a gyroscope, and a distance sensor affixed to the handheld projector.

4. The method of claim 1, wherein the handheld projector includes a sensing apparatus, and wherein receiving the signal broadcasted by the virtual environmental trigger comprises sensing, by the sensing apparatus, the signal from a transmitter affixed to the display surface.

5. The method of claim 1, further comprising:
   upon determining that the first animated object has encountered a physical environmental trigger, modifying one or more elements of a physical environment in which the display frames are being projected.

6. The method of claim 5, wherein the handheld projector includes a sensing apparatus, and wherein determining that the first animated object has encountered the physical environmental trigger comprises sensing, by the sensing apparatus, a signal from a transmitter affixed to the display surface.

7. The method of claim 1, wherein the handheld projector is integrated with at least a processor, a memory and an application program, which when executed on the processor, determines the current position of the handheld projector and generates the display frames.

8. The method of claim 1, further comprising, determining the presence of a second handheld projector projecting a respective sequence of display frames, wherein the projected image of the first object further depends one or more objects projected by the second handheld projector.

9. A non-transitory computer-readable storage medium storing instructions that, when executed by a processor, perform an operation to generate a plurality of display frames to project using a handheld projector, the operation comprising:
   generating a first display frame to project from the handheld projector, wherein the handheld projector projects the first frame on a display surface, and wherein the first display frame includes one or more animated objects responsive to changes in position of the handheld projector;
   receiving an indication of a current position and orientation of the handheld projector;
   receiving a signal broadcast from a virtual environmental trigger affixed to the display surface, wherein the signal is received when the virtual environmental trigger is within a display frame projected by the handheld projector; and,
   generating one or more subsequent display frames projected from the handheld projector, wherein the animation of at least a first one of the animated objects in the one or more subsequent display frames depends on the current position and orientation of the handheld projector and further depends on the position of the virtual environmental trigger within the display frame.

10. The computer-readable storage medium of claim 9, wherein the current position and orientation of the handheld projector is further determined from one or more sensing devices providing feedback to the handheld projector.

11. The computer-readable storage medium of claim 10, wherein the sensing devices includes at least one an accelerometer, magnetometer, a gyroscope, and a distance sensor affixed to the handheld projector.

12. The computer-readable storage medium of claim 9, wherein the handheld projector includes a sensing apparatus, and wherein receiving the signal broadcasted by the virtual environmental trigger comprises sensing, by the sensing apparatus, the signal from a transmitter affixed to the display surface.

13. The computer-readable storage medium of claim 9, wherein the operation further comprises:
   upon determining that the first animated object has encountered a physical environmental trigger, modifying one or more elements of a physical environment in which the display frames are being projected.

14. The computer-readable storage medium of claim 13, wherein the handheld projector includes a sensing apparatus, and wherein determining that the first animated object has encountered the physical environmental trigger comprises sensing, by the sensing apparatus, a signal from a transmitter affixed to the display surface.

15. The computer-readable storage medium of claim 9, wherein the processor is integrated with handheld projector.

16. The computer-readable storage medium of claim 9, wherein the operation further comprises, determining the presence of a second handheld projector projecting a respective sequence of display frames, wherein the projected image of the first object further depends one or more objects projected by the second handheld projector.

17. A system, comprising:
a handheld projector,
a memory; and
a processor configured to perform an operation to generate a plurality of display frames to project using the handheld projector, the operation comprising:
generating a first display frame to project from the handheld projector, wherein the handheld projector projects the first frame on a display surface, and wherein the first display frame includes one or more animated objects responsive to changes in position of the handheld projector,
receiving an indication of a current position and orientation of the handheld projector,
receiving a signal broadcast by a virtual environmental trigger affixed to the display surface, wherein the signal is received when the virtual environmental trigger is within a display frame projected by the handheld projector; and,
generating one or more subsequent display frames projected from the handheld projector, wherein the animation of at least a first one of the animated objects in the one or more subsequent display frames depends on the current position and orientation of the handheld projector and further depends on the position of the virtual environmental trigger within the display frame.

18. The system of claim 17, wherein the sensing devices includes at least one an accelerometer, magnetometer, a gyroscope, and a distance sensor affixed to the handheld projector.

19. The system of claim 17, wherein the handheld projector includes a sensing apparatus, and wherein receiving the signal broadcasted by the virtual environmental trigger comprises sensing, by the sensing apparatus, the signal broadcast from a transmitter affixed to the display surface.

20. The system of claim 17, wherein the operation further comprises:
upon determining that the first animated object has encountered a physical environmental trigger, modifying one or more elements of a physical environment in which the display frames are being projected.

21. The system of claim 20, wherein the handheld projector includes a sensing apparatus, and wherein determining that the first animated object has encountered the physical environmental trigger comprises sensing, by the sensing apparatus, a signal from a transmitter affixed to the display surface.

22. The system of claim 17, wherein the operation further comprises, determining the presence of a second handheld projector projecting a respective sequence of display frames, wherein the projected image of the first object further depends one or more objects projected by the second handheld projector.

* * * * *